United States Patent [19]

Matsumoto et al.

[11] Patent Number: 5,647,820
[45] Date of Patent: Jul. 15, 1997

[54] HYDRAULIC CONTROL SYSTEM OF AUTOMATIC TRANSMISSION

[75] Inventors: Akio Matsumoto; Tatsutoshi Mizobe; Kozo Ishii; Hiroshi Shinozuka, all of Hiroshima, Japan

[73] Assignee: Mazda Motor Corporation, Hiroshima, Japan

[21] Appl. No.: 217,901

[22] Filed: Mar. 25, 1994

[30] Foreign Application Priority Data

Mar. 26, 1993 [JP] Japan .................. 5-068766

[51] Int. Cl.$^6$ ............................. F16H 61/04
[52] U.S. Cl. ................ 477/155; 477/156; 477/160
[58] Field of Search .................. 477/121, 143, 477/154, 156, 158, 159, 155, 160, 53

[56] References Cited

U.S. PATENT DOCUMENTS

| | | | |
|---|---|---|---|
| 4,790,418 | 12/1988 | Brown et al. | 475/128 X |
| 4,953,090 | 8/1990 | Narita | 477/155 X |
| 5,007,308 | 4/1991 | Narita | 477/155 X |
| 5,014,575 | 5/1991 | Fujiwara et al. | 477/155 X |
| 5,086,670 | 2/1992 | Nitz et al. | 477/154 |
| 5,109,826 | 5/1992 | Kato | 477/102 X |
| 5,168,776 | 12/1992 | Otsubo et al. | 477/109 |
| 5,188,005 | 2/1993 | Sankpal et al. | 477/155 X |
| 5,282,401 | 2/1994 | Hebbale et al. | 477/120 X |
| 5,289,741 | 3/1994 | Debs et al. | 477/131 X |
| 5,429,561 | 7/1995 | Wakahara et al. | 477/156 |

FOREIGN PATENT DOCUMENTS 2-76968 3/1990 Japan .
3-199762 8/1991 Japan .

Primary Examiner—Charles A. Marmor
Assistant Examiner—Peter T. Kwon
Attorney, Agent, or Firm—Keck, Mahin & Cate

[57] ABSTRACT

A hydraulic control system of an automatic transmission during a shift operation wherein a control pressure is controlled to selectively engage and release a plurality of frictional elements to establish a desirable shift stage comprising inertia phase detecting device for detecting a starting point of an inertia phase of the shift operation from one shift stage to another, and control pressure reducing device for gradually reducing the control pressure introduced to a frictional element to be engaged after the inertia phase is detected. The torque shock in the shift operation can be effectively reduced.

8 Claims, 5 Drawing Sheets

HYDRAULIC CONTROL SYSTEM OF AUTOMATIC TRANSMISSION

BACKGROUND OF THE INVENTION

1. Field of the Invention

The present invention relates to a hydraulic control system of an automatic transmission, in particular, to a control for detecting an inertia phase of the shift operation to gradually reduce a hydraulic pressure for frictional elements actuated in the shift operation to thereby suppress a shift shock.

2. Description of the Prior Art

Generally, in an automatic transmission for an automotive vehicle, an engine output is introduced through a torque converter to a shift gear mechanism in which a plurality of frictional elements are selectively switched to be actuated to change a power transmitting path thereby establishing a specific shift stage automatically in accordance with a vehicle operating condition, such as vehicle speed, acceleration stroke and the like. As disclosed in Japanese Patent Public Disclosure No. 2-76968, laid open to the public in 1990, the frictional elements are engaged and disengaged by means of a hydraulic control pressure produced in a hydraulic control circuit which is provided with various control valves. Introduction of the hydraulic control pressure is controlled in accordance with a shift pattern provided based on the vehicle operating condition.

The hydraulic control pressure is changed to have an leveled pressure condition in which an engaging hydraulic pressure to an ongoing frictional element is gradually changed. The leveled pressure condition during the shift operation is produced by virtue of an accumulator which is disposed in a hydraulic line through which the engaging pressure is introduced to the frictional element to be engaged. Thus, the control pressure is gradually changed in the leveled pressure condition so that a shift shock accompanying the engaging action of the frictional element can be effectively eased. Alternatively, in order to obviate such shift shock, it has also been known that a line pressure in the hydraulic control circuit is reduced in accordance with an engine load or a kind of the shift operations, such as a 1–2 shift operation in which the shift operation is made from the first to the second shift stage, a 2–3 shift operation from the second to third shift stage, 3–4 shift operation from the third to fourth shift stage and the like.

The conventional hydraulic control system of the automatic transmission is however disadvantageous in that a gradient of the control pressure during the leveled pressure condition takes a substantially constant value which is not variable because the leveled pressure condition is produced by a resilient force of a spring provided in the accumulator irrespective of the control of a decrement of the line pressure of the hydraulic control circuit. Meanwhile, a shift operation is generally done from one shift stage to another in such a manner that one frictional element engaged in the one shift stage is controlled to be disengaged and another frictional element disengaged in the one shift stage is controlled to be engaged so as to establish the other shift stage. Therefore, when the one frictional element is actuated to be disengaged reducing a transmitting torque amount therethrough in the case where the other frictional element is actuated to be engaged increasing the transmitting torque therethrough but yet produced enough to make up the reduction of the transmitting torque amount due to the disengaging action of the one frictional element, the turbine speed or input speed of the transmission is increased. Then, as the transmitting torque or engaging force of the other frictional element is increased, the turbine speed starts to be reduced. When the turbine speed is substantially increased after the shift operation starts, it is referred to as a torque phase of the shift operation. When the turbine speed is reduced following the torque phase, it is referred to as an inertia phase. Thus, it will be understood that the engaging action of the other frictional element starts when the phase is changed from the torque phase to the inertia phase. It will be also understood that the engaging action is dominated by the gradient of the control pressure during the leveled pressure condition which is fixed by the resilient force of the spring of the accumulator irrespective of the control of the line pressure as aforementioned. As a result, a shift shock is inevitably produced.

In Japanese Patent Public Disclosure No. 3-199762, laid open to the public in 1991, a line pressure is controlled to eliminate an abrupt hydraulic pressure change as changed to have a peak portion appearing in an initial and a final stages of the leveled pressure condition. However, This cannot change the gradient of the hydraulic pressure change. Therefore, this control is not able to eliminate an abrupt increase of the transmitting torque amount, that is, he engaging force during the leveled pressure condition so that a shift shock is still produced.

SUMMARY OF THE INVENTION

It is therefore an object of the present invention to solve the above problem and to suppress a torque shock in a shift operation of an automatic transmission by controlling a hydraulic pressure for the shift operation.

It is another object of the present invention to provide an improved hydraulic control system for an automatic transmission.

The above and other objects of the invention can be accomplished by a hydraulic control system of an automatic transmission during a shift operation wherein a control pressure is controlled to selectively engage and release a plurality of frictional elements to establish a desirable shift stage comprising an inertia phase detecting means for detecting a starting point of an inertia phase of the shift operation from one shift stage to another, and control pressure reducing means for gradually reducing the control pressure introduced to a frictional element to be engaged after the inertia phase is detected.

In another aspect of the invention, a hydraulic control system of an automatic transmission during a shift operation wherein a line pressure of a hydraulic control circuit for the automatic transmission is controlled to have a leveled pressure condition in which the line pressure is gradually changed by means of an accumulator, and wherein a plurality of frictional elements are controlled by the line pressure to be selectively engaged and released to establish a desirable shift stage comprising an inertia phase detecting means for detecting a starting point of an inertia phase of the shift operation from one shift stage to another, and line pressure reducing means for gradually reducing the line pressure introduced to a frictional element to be engaged after the inertia phase is detected.

Preferably, the line pressure and control pressure are controlled in accordance with a parameter which affects torque change characteristic the transmission during the shift operation, such as a throttle opening, turbine speed and the like.

In a preferred embodiment, the hydraulic control system comprises turbine speed detecting means for detecting a turbine speed of the transmission. And, the inertia phase detecting means detects the inertia phase when the turbine speed change is reduced below a predetermined value after the shift operation is initiated.

According to the present invention, the control pressure reducing means gradually reduces the control pressure to the frictional element to be engaged in the shift operation after the inertial phase is detected. Therefore, the engaging speed of the frictional element is reduced so that an abrupt output torque change can be effectively suppressed during the shift operation. Thus, the torque shock accompanying the shift operation can be also suppressed. In another aspect, the line pressure is gradually reduced after the inertia phase is detected. Therefore, the gradient of the hydraulic pressure change in the leveled pressure condition during the shift operation is reduced so that the engaging speed of the frictional element is substantially reduced to ease the shift shock. In a preferred embodiment, the control pressure and the line pressure are controlled based on a parameter which affects a torque amount transmitted through the transmission. Therefore, the hydraulic pressure which controls an engaging action of the frictional element can be precisely controlled to be reduced with a desirable characteristic.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
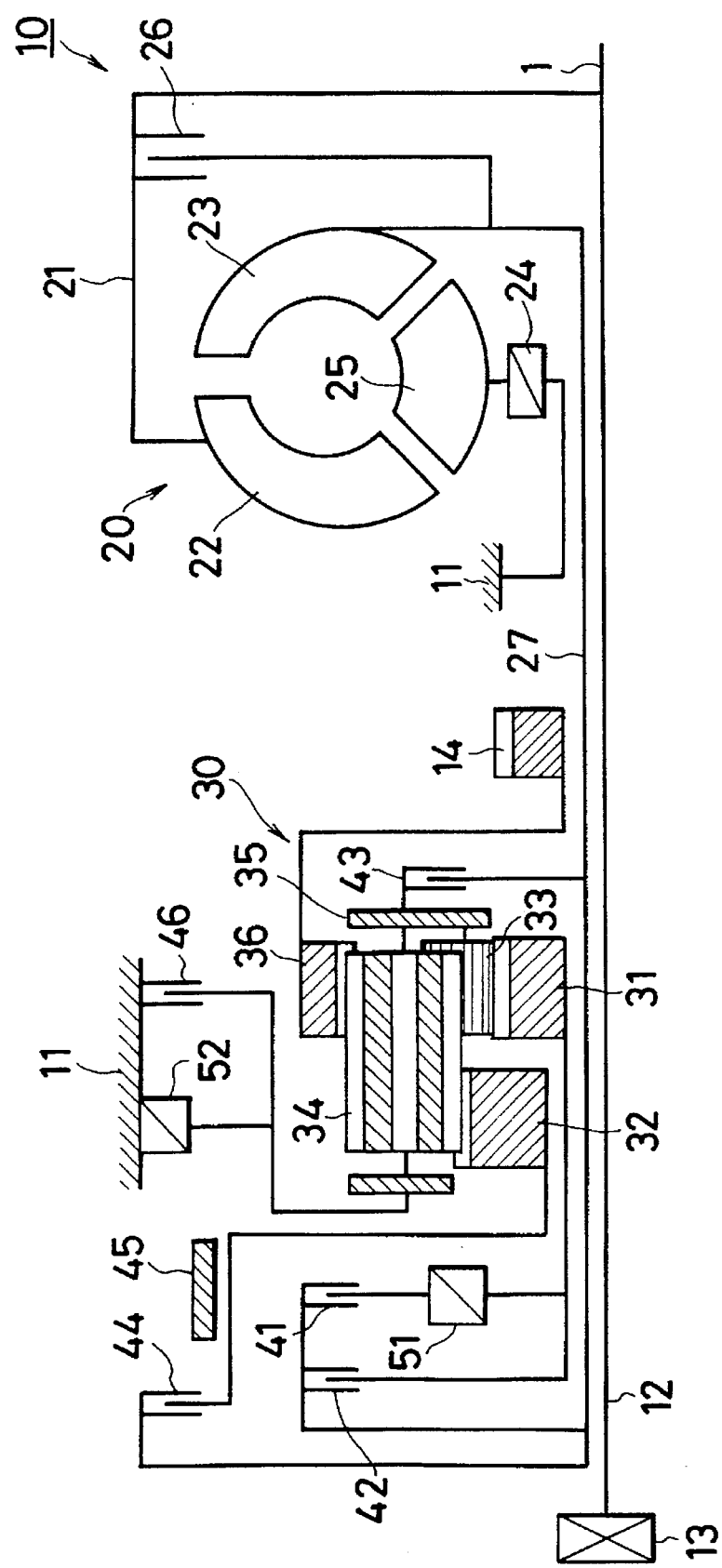
FIG. 1 is a schematic view of an automatic transmission with a shift control system in accordance with a preferred embodiment of the present invention.

Referring to FIG. 1, an automatic transmission 10 according to the present invention includes a torque converter 20, a transmission gear mechanism 30 driven by an output of the torque converter 10, a plurality of frictional elements 41–46, such as clutches and brakes for switching a power transmitting path of the transmission gear mechanism 30 and one way clutches 51 and 52 among running ranges D, S, L and R and shift stages 1–4 in the D range, 1–3 in the S range and 1 and 2 in the L range.

The torque converter 20 is provided with a pump 22 integral with a transmission case 21 connected with an output shaft 1 of an engine, a turbine 23 disposed facing the pump 22 and driven thereby through a hydraulic fluid, a stator 25 disposed between the pump 22 and turbine 23 and carried by the converter case 21 through an one way clutch 24 and a lock up piston 26 disposed between the turbine 23 and the converter case 21. A rotation of the pump 22 is transmitted to the turbine through a hydraulic fluid which is filled in the converter case 21. A torque is amplified by means of the stator in accordance with a rotation difference between the pump and turbine 23. To the engine output shaft 1 is connected a pump shaft 12, which passes through the turbine shaft 27, drives an oil pump 13 which is disposed at a rear end portion of the transmission gear mechanism 30.

The transmission gear mechanism 30 is constituted by Ravigneaux-type planetary gear mechanism and provided with a a small sun gear 31 arranged over the turbine shaft 27, a large sun gear arranged over the turbine shaft 27 rearward of the small sun gear 31, a plurality of short pinion gears 33 meshed with the small sun gear 31, long pinion gear 34 of which rear portion is meshed with the large sun gear 32, a carrier 35 rotatably supporting the long pinion gear 34 and the short pinion gear 33 and a ring gear 36 meshed with the long pinion gear 34.

Between the turbine shaft 27 and small sun gear 31 are disposed a forward clutch 41 and a first one way clutch 51 in tandem. A coast clutch 42 is juxtaposed with the clutch 41 and 51. A 3–4 clutch 43 is disposed between the turbine shaft 27 and the carrier 35. A reverse clutch 44 is disposed between the turbine shaft 27 and the large sun gear 32. Between the large sun gear 32 and the reverse clutch 44 is disposed a 2–4 brake 45 of a band brake for fixing the large sun gear 32. A second one way clutch 52 for receiving a reaction force of the carrier 35 and a low-reverse brake 46 for fixing the carrier 35. The ring gear 36 is connected with the output gear 14 through which the rotation is transmitted to right and left wheels (not shown).

Table 1 shows operations of the respective frictional elements 41–46 such as clutches and brakes and one way clutches 51 and 52 in which circles shows engaged conditions.

TABLE 1

| RANGE | P | R | N | D | | | | S | | | L | |
|---|---|---|---|---|---|---|---|---|---|---|---|---|
| SHIFT STAGE | | | | 1 | 2 | 3 | 4 | 1 | 2 | 3 | 1 | 2 |
| FORWARD CLUTCH (41) | | | | ○ | ○ | ○ | ○ | ○ | ○ | ○ | ○ | ○ |
| COAST CLUTCH (42) | | | | | | ○ | | | ○ | ○ | ○ | ○ |
| 3-4 CLUTCH (43) | | | | | | ○ | ○ | | | ○ | | |
| REVERSE CLUTCH (44) | | ○ | | | | | | | | | | |
| 2-4 BRAKE (45) | | | | | ○ | | ○ | | ○ | | | ○ |

TABLE 1-continued

| RANGE | P | R | N | D | | | | S | | | L | |
|---|---|---|---|---|---|---|---|---|---|---|---|---|
| SHIFT STAGE | | | | 1 | 2 | 3 | 4 | 1 | 2 | 3 | 1 | 2 |
| LOW REVERSE BRAKE (46) | O | | | | | | | | | | O | |
| ONE WAY CLUTCH (43) FIRST (51) | | | | O | O | O | | O | O | O | O | O |
| ONE WAY CLUTCH (43) SECOND (52) | | | | | O | | | | O | | O | |

Figure 2:
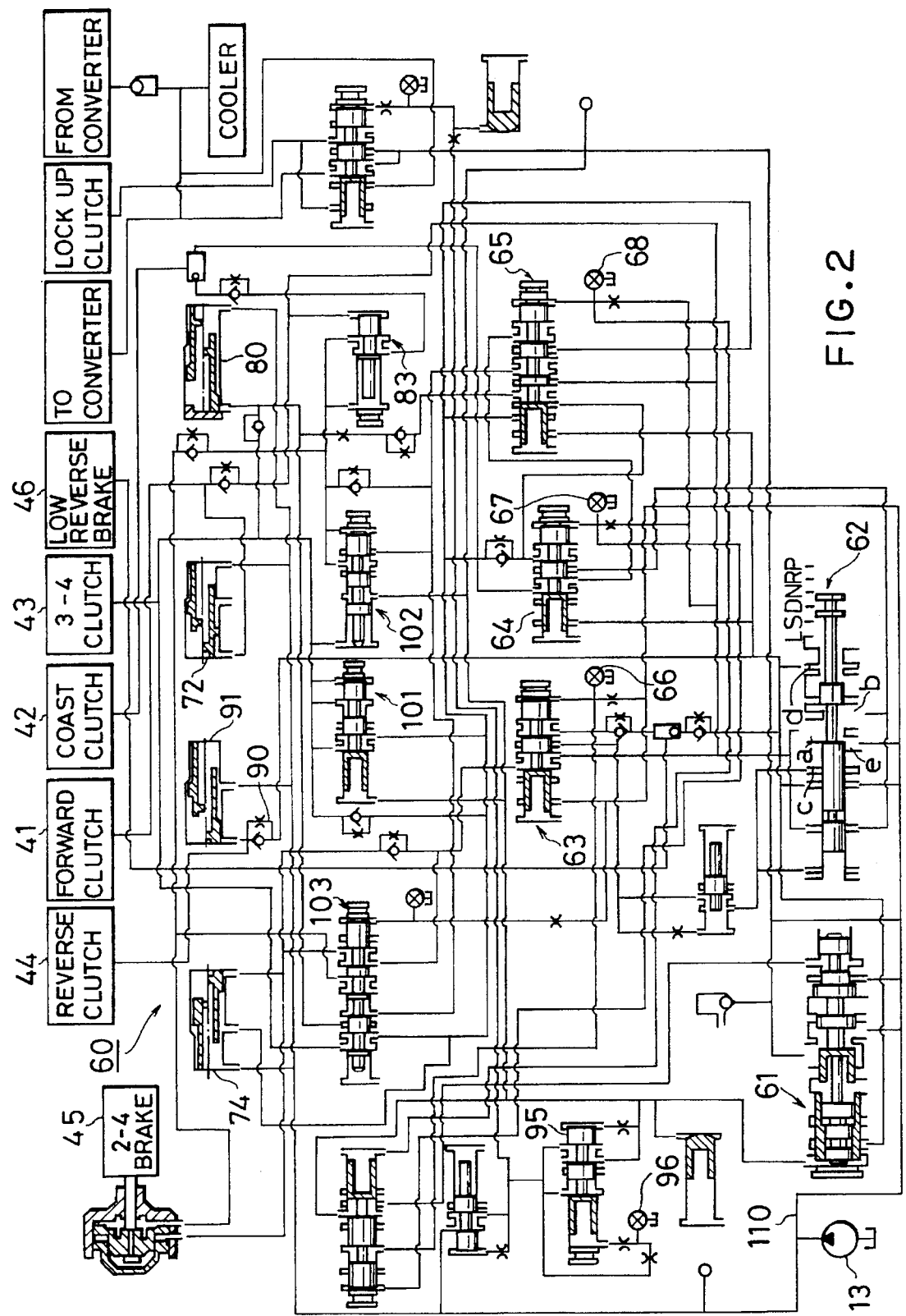
FIG. 2 is a block chart of a hydraulic control circuit incorporated into the automatic transmission of FIG. 1.

The frictional elements 41–46 are controlled by a hydraulic pressure from a hydraulic pressure control circuit 60 controlling actuators of the frictional elements 41–46 as shown in FIG. 2.

The hydraulic control circuit 60 includes a regulator valve 61 for adjusting a hydraulic pressure delivered to a main line 110 from the oil pump 13 of FIG. 1 to a predetermined line pressure, a manual valve 62 for selecting a range by a manual operation, a first, second and third shift valve 63, 64 and 65 for controlling the hydraulic pressure of the actuators of the frictional elements 41–46.

The regulator valve 61 is actuated by a duty solenoid valve 96 in accordance with a vehicle operating condition so that a line pressure of the control circuit is adjusted by a stemless control pressure produced by the duty solenoid valve 96. The control pressure by the solenoid valve 96 is introduced to a modifier valve 95 to adjust a modifier pressure to thereby actuate the regulator valve 61. As a result, a spool of the regulator valve 61 is moved in accordance with the modifier pressure so that the line pressure is changed in accordance with the movement of the spool.

The line pressure is introduced to the manual valve 62 through an input port e so that a spool in a sleeve thereof is moved in accordance with a selected range to communicate an output port among a–d wherein the range includes D, S ranges (provided by ports a and b respectively), L range (provided by ports a and c) and R range (provided by port d).

Figure 3:
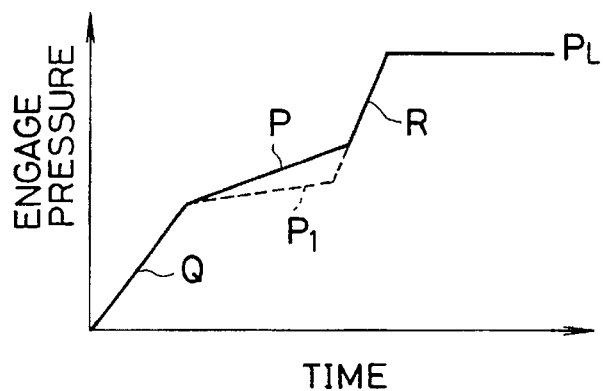
FIG. 3 is a time chart showing a hydraulic pressure change for engaging a frictional element.

The spools of the 1–2, 2–3, 3–4 shift valves 63, 64 and 65 are moved in the right and left direction in FIG. 3 to control introduction of the hydraulic pressure to the frictional element 41–46. Solenoid valves 66–68 are provided corresponding to the shift valves 63–65.

When the solenoid valves 66–68 are ON, the hydraulic pressures to the valves 63, 64 and 65 are drained. When the solenoid valves 66–68 are OFF, the shift valves 63, 64 and 65 produce switching pressures respectively to move spools thereof to the left. Relationship between ON, OFF operations of the solenoid valves 66–68 and respective shift stages of the D, S and L ranges are shown in Table 2.

TABLE 2

| RANGE | D | | | | S | | | L | |
|---|---|---|---|---|---|---|---|---|---|
| SHIFT STAGE | 1 | 2 | 3 | 4 | 1 | 2 | 3 | 1 | 2 |
| FIRST SOLENOID VALVE (66) | OFF | ON | ON | ON | OFF | ON | ON | OFF | ON |
| SECOND SOLENOID VALVE (67) | ON | ON | OFF | OFF | ON | ON | OFF | ON | ON |
| THIRD SOLENOID VALVE (68) | ON | ON | OFF | ON | ON | OFF | OFF | OFF | OFF |

Among the frictional elements 41–46, the forward clutch 41, 3–4 clutch 43, reverse clutch 44 and 2–4 brake 45 influence on an output torque change characteristic of the transmission when they are engaged. In view of this, accumulators 72, 80, 91 and 74 are disposed in hydraulic lines, through which engaging pressures are introduced to the frictional elements, for controlling the influence on the output torque change characteristic of the transmission. The accumulators 72, 80, 91 and 74 are provided with springs therein which are resiliently deformed in response to the hydraulic pressure introduced therein so that the engaging pressures to the frictional elements 41, 43, 44 and 45 are so changed as to have a leveled pressure condition P (shown by real line in FIG. 3) in which the engaging pressures are gradually increased in an initial stage of introduction of the engaging pressures to the frictional elements. The frictional elements 41, 43, 44 and 45 are engaged when the hydraulic pressure is controlled within the leveled pressure condition P. As a result, the increment of the torque amount transmitted through the transmission is restrained to ease a torque shock in the shift operation. Meanwhile, the engaging pressure is changed to have abrupt portions Q and R before and after the leveled pressure condition P as shown in FIG. 3. The abrupt portion Q is effected to shorten a time needed for the engaging action of the frictional element. The abrupt portion R increases the engaging force of the frictional element to provides a stable engaging condition therfor.

There are disposed a coast control valve 83 for controlling the coast clutch 42, bypass valve 101 for controlling the 3–4 clutch, 2–3 control valve 102 and timing valve 103 for controlling the 2–4 brake 45.

Figure 4:
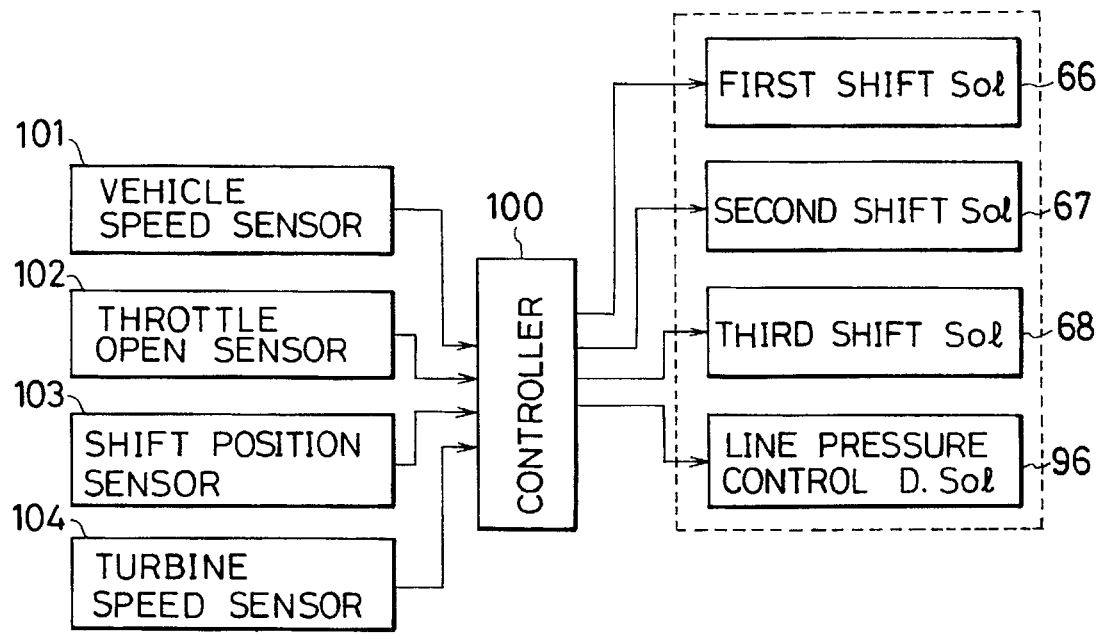
FIG. 4 is a block chart of a hydraulic control system for the automatic transmission.

As shown in FIG. 4, the first, second, third solenoid valves 66, 67 and 68 for the shift operation and the duty solenoid valve 96 for the line pressure control are controlled to make ON, OFF operation and a duty ratio operation based on control signals produced by a controller 100 shown in FIG. 4. The control signals are set in light of a map which is prepared in advance based on various parameters denoting the vehicle operating condition obtained from a vehicle speed sensor 101, throttle opening sensor 102, shift position sensor 103, turbine speed sensor 104 and the like.

Figure 5:
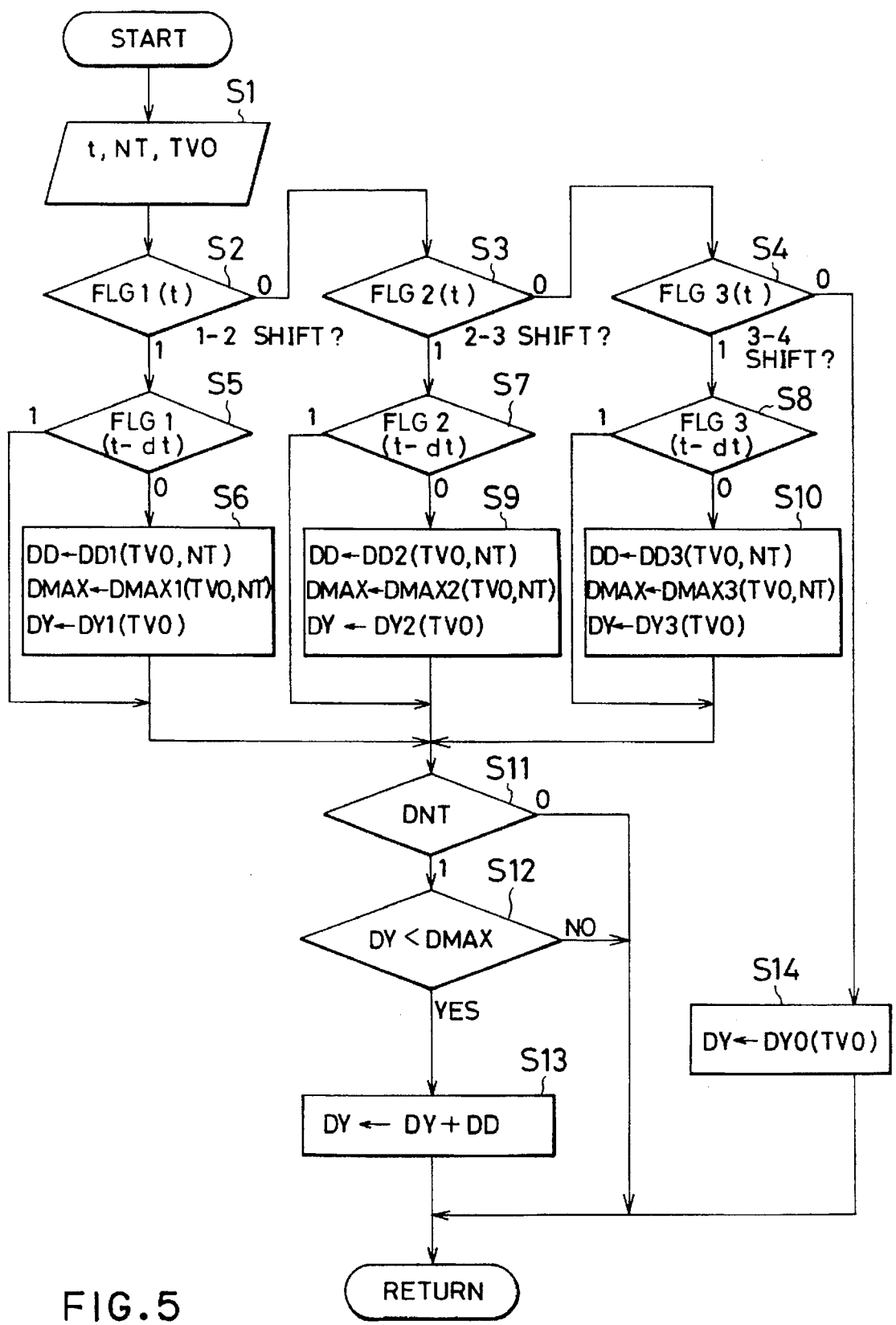
FIG. 5 is a flow chart of a hydraulic pressure control during a shift operation in accordance with a preferred embodiment.

The line pressure control is made in accordance with a procedure shown in FIG. 5.

The controller 100 reads a time period from the start of the shift control, turbine speed NT and throttle opening TVO (step S1) and judges whether or not the shift command is produced for the 1–2, 2–3, 314 4 shift operation or the like (steps 2, 3 and 4).

In step S2, the controller 100 judges whether or not shift flag FLG1 is 1. If the flag FLG1 is 1, this shows that the on-going shift command is the 1–2 shift operation. In this case, the controller 100 further judges whether or not the shift command is produced for the 1–2 shift operation in the precedent cycle.

If the flag FLG1 is 0 which shows the 1-2 shift command is produced in the current cycle, the controller 100 carries out step S6 where the controller initializes the control signal of the duty solenoid valve 96. In this step S6, the controller 100 sets the decrement DD1 of the duty solenoid valve in the 1–2 shift operation based on the throttle opening TVO, turbine speed NT and initial value DY1 of the duty ratio in the 1–2 shift operation based on the upper limit DMAX1 of the duty value and throttle opening TVO.

Likewise, if the shift flag FLG1 is 1 in step S3 which shows the shift command is produced for the 2–3 shift operation (step S3), or if the shift flag FLG1 is 1 in step S4 which shows that the controller 100 further judges whether or not the 1–2 or 2–3 shift command was produced in the preceding cycle in the steps S7 and S8. If such a shift command is produced in the current proceeding cycle, the controller 100 initializes the control signals in accordance with the shift command in the steps S9 and S10. In step S9, the controller 100 sets a decrement DD2, upper limit DMAX2 and initial value DY2 of the duty value in the 2–3 shift control. In step S10, the controller 100 sets a decrement DD3, upper limit DMAX3, and DY3 of the duty ratio in the 3–4 shift control.

As aforementioned, in the steps S6, S9 and S10, the control signal of the duty solenoid valve 96 is initialized in accordance with respective shift operations. Next, the controller makes a judgment with regard to a control phase DNT including a torque phase and inertial phase in step 11. This DNT judgment is made based on a change of the turbine speed NT to find when the torque phase is switched to the inertial phase.

Figure 6:
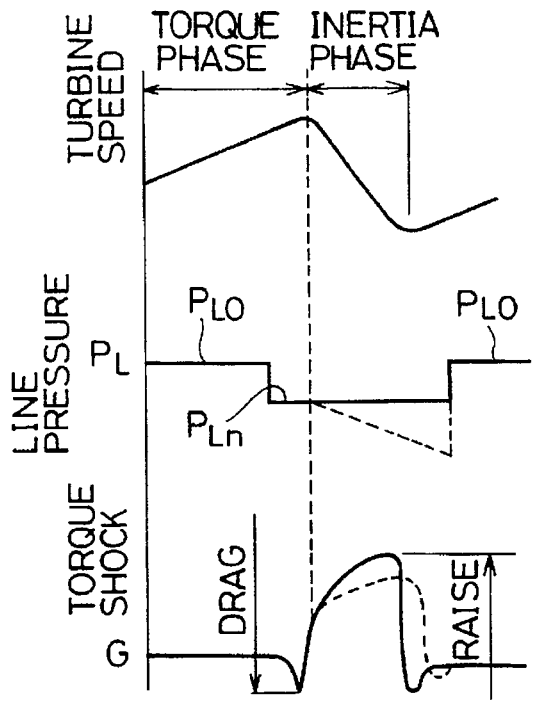
FIG. 6 is a time chart showing changes of a turbine speed, line pressure, torque shock level accompanying the shift operation.
Figure 7:
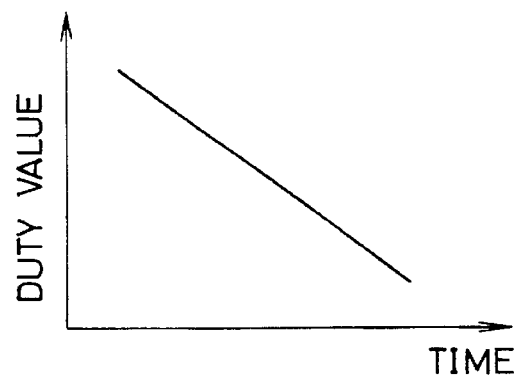
FIG. 7 is a view showing a relationship between a duty value and a time.

When the turbine speed starts to substantially increased after the shift operation starts, the torque phase of the shift operation starts. When the turbine speed is reduced following the torque phase, the inertia phase starts as shown in FIG. 6. In the illustrated embodiment, turbine speed change is calculated based on the formula: DN=NT(t)–NT(t–dt). In the case of DN=<dNT, the controller 100 finds the inertia phase. On the other hand, in the case of DN>dNT, the controller 100 finds the torque phase wherein the value of dNT is predetermined as a negative value or zero. If the flag DNT is 1 which shows the inertia has started, the controller 100 further judges whether or not the duty ratio DY for the line pressure is smaller than the upper limit DMAX in step S12. If this judgment is Yes, the controller 100 calculates and produces a new duty value DY by adding the value DD. The gradient of the duty value DY relative to the time depends on the decrement DD. Therefore, the duty ratio DY changes as shown in FIG. 7.

Meanwhile, when the flags FLG1 for detecting the 1–2 shift operation, the flag FLG 2 for detecting the 2–3 shift operation and the flag FLG3 for detecting the 3-4 shift operation are zero in steps S2, S3 and S4, the controller 100 carries out step S14 and provides the duty value DY with a value DY0 which is set for other than the shift operations. In step S11, when the flag DNT is 0 which shows the torque phase, and in step S12, when the judgment is NO that shows the duty value DY has reached the upper limit DMAX, the controller 100 returns to the top of the routine without setting the decrement value DD.

Figure 8:
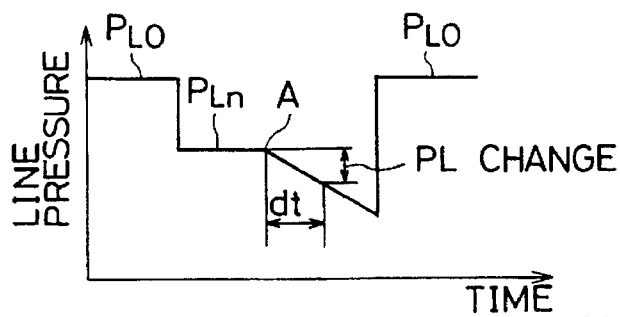
FIG. 8 is a line pressure characteristic during a shift operation.

Therefore, in the illustrated embodiment, where the 1–2 shift operation, 2–3 shift operation, or 3–4 shift operation is made, the line pressure PL is determined by the duty value DY in accordance with the respective shift operations. As a result, the line pressure PL0 corresponding to the duty value other than the shift operation is reduced to a line pressure PLn in the shift operations as shown in FIGS. 6 and 8 as stated above in connection with steps S2–S10. When the torque phase is switched to the inertia phase as shown by a point A in FIG. 8, the decrement DD is added to the duty value DD. As a result, the line pressure PLn during the shift operation is gradually reduced as aforementioned in connection with the steps S11–S13. When the shift operation is completed, the line pressure is returned to the value PL0 for a condition other than the shift operation. Thus, according to the illustrated embodiment, the line pressure PLn is reduced during the inertia phase so that the gradient of the leveled pressure portion P (shown by a real line in FIG. 3) produced by the accumulators 72, 80, 91 and 74 which are disposed in hydraulic supply lines for the forward clutch 41, 3–4 clutch 43, reverse clutch 44 and 2–4 clutch 45 can be reduced be a leveled portion P1 as shown by a broken line in FIG. 3. Conventionally, the gradient of the leveled pressure portion produced by an accumulator disposed in a hydraulic supply line for a frictional element has not been adjustable. It is, however, understood that the gradient of the leveled pressure portion in the shift operation can be adjusted through the hydraulic pressure control according to the present invention as aforementioned. Thus, an abrupt increase of the torque amount transmitted to the output member of the transmission gear mechanism can be effectively suppressed. Consequently, the engaging speed of the on going frictional element is reduced so that a prospective torque shock (G) accompanying the shift operation as shown in FIG. 6 can be reduced as seen from the real line to the broken line.

It has been experienced that if the line pressure PL is reduced before the inertia phase starts, the dragging of the torque is remarkably increased to cause undesirable shift shock when the inertia phase starts.

Thus, it is disadvantageous that the line pressure PL is controlled to be reduced before the inertia phase.

In the illustrated embodiment, the throttle valve opening TVO and turbine speed NT are employed as parameters which influence the torque change characteristic during a shift operation, and are utilized to determine the duty value of the duty solenoid valve 96. These parameters enable a precise hydraulic control for the ongoing frictional element to effectively reduce the shift shock (G).

In order to control the engaging speed of the frictional element to reduce the shift shock, it is not necessarily to control the leveled pressure condition produced by the accumulator. It is possible that the engaging hydraulic pressure for the frictional element can be directly controlled to reduce the engaging speed of the ongoing frictional element during the inertia phase.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A hydraulic control system of an automatic transmission in which a control pressure is controlled during a shift operation to selectively engage and release a plurality of frictional elements to establish a desirable shift stage comprising:

an inertia phase detecting means for detecting a starting point of an inertia phase of the shift operation from one shift stage to another, control pressure reducing means for gradually reducing the control pressure introduced to a frictional element to be engaged after the inertia phase is detected, and turbine speed detecting means for detecting a turbine speed of the transmission, the inertia phase detecting means detecting the inertia phase when a turbine speed change is reduced below a predetermined value after the shift operation is initiated.

2. A hydraulic control system as recited in claim 1 wherein the control pressure is controlled in accordance with a parameter which affects a torque change characteristic of the transmission during the shift operation.

3. A hydraulic control system as recited in claim 2 wherein the parameter is a throttle opening.

4. A hydraulic control system as recited in claim 2 wherein the parameter is a turbine speed.

5. A hydraulic control system of an automatic transmission in which a line pressure of a hydraulic control circuit for the automatic transmission is controlled during a shift operation to have a leveled pressure condition in which the line pressure is gradually changed by an accumulator, and wherein a plurality of frictional elements are controlled by the line pressure to be selectively engaged and released to establish a desirable shift stage comprising:

an inertia phase detecting means for detecting a starting point of an inertia phase of the shift operation from one shift stage to another, line pressure reducing means for gradually reducing the line pressure introduced to a frictional element to be engaged after the inertia phase is detected, and turbine speed detecting means for detecting a turbine speed of the transmission, the inertia phase detecting means detecting the inertia phase when a turbine speed change is reduced below a predetermined value after the shift operation is initiated.

6. A hydraulic control system as recited in claim 5 wherein the line pressure is controlled in accordance with a parameter which affects a torque change characteristic of the transmission during the shift operation.

7. A hydraulic control system as recited in claim 6 wherein the parameter is a throttle opening.

8. A hydraulic control system as recited in claim 6 wherein the parameter is a turbine speed.

* * * * *